Figure 3:
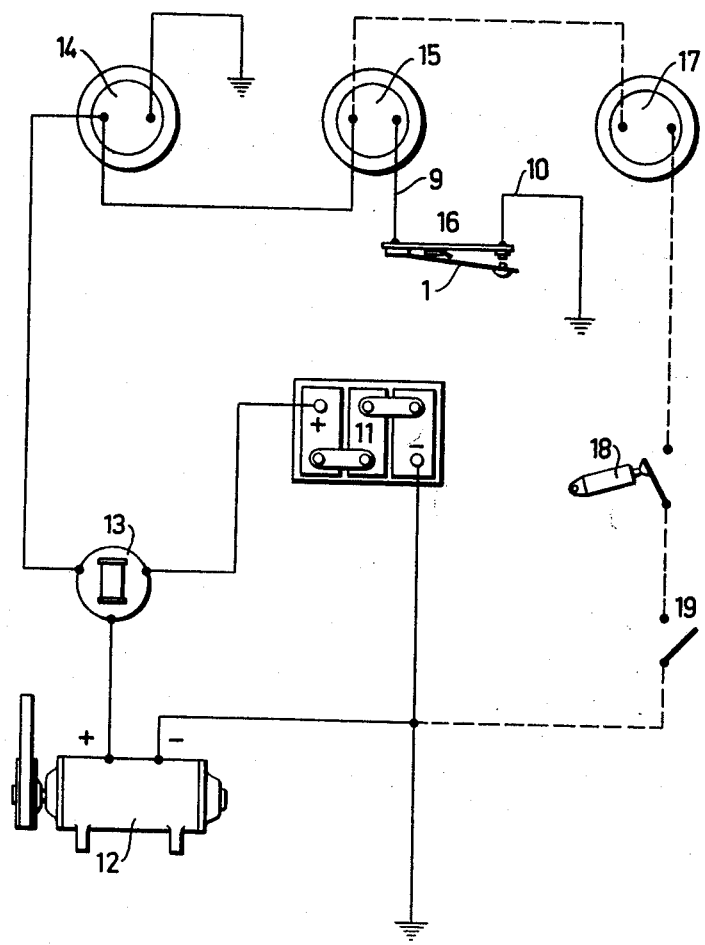

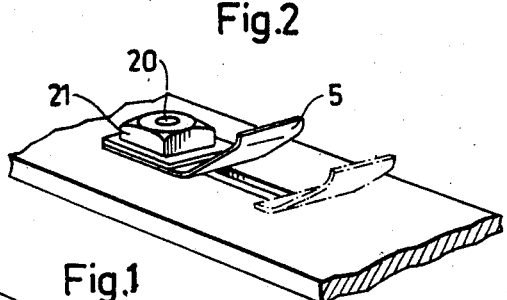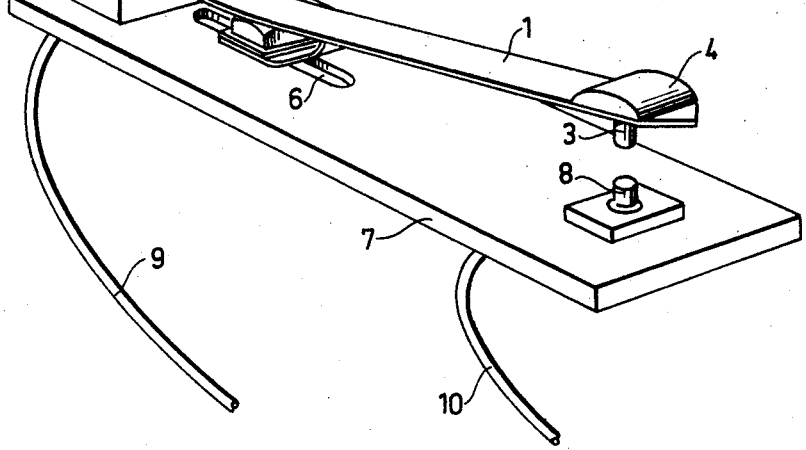

United States Patent Office 3,182,440
Patented May 11, 1965

3,182,440
APPARATUS FOR INDICATING THE EFFECTIVE OPERATING TIME OF WORKING-MACHINES
Lars Harald Widegren, Arent Grapegatan 31, Kiruna, Sweden
Continuation of application Ser. No. 285,458, June 3, 1963. This application Sept. 28, 1964, Ser. No. 404,998
Claims priority, application Sweden June 4, 1962
2 Claims. (Cl. 58—145)

This application is a continuation of applicant's co-pending application Serial No. 285,458, filed June 3, 1963, now abandoned.

This invention refers to an apparatus for indicating the effective operating time of working-machines.

In working-machines of different types, for instance bulldozers, tractors, trucks and loading machines, there is a great need for a reliable, simple and cheap device which can record the effective time of operation of the machine and thus give an indication of the utilization of the same. Machines of this type represent a great investment of money by the owner and it is essential that they are utilized as effectively as possible. It is also of great importance to the length of life of these machines that maintenance, for instance in the form of greasing, is carried out after they have been in operation for a certain number of hours. This time of operation is difficult to estimate, and a device of the above-mentioned type would be of great value also from this point of view.

It is known in the prior art to provide trucks with travel indicating and measuring means containing so-called vibration clocks which by means of a stylus make an indication on a diagram sheet, from which a reading can be made of when the truck has been driven and when it has been standing still. Vibration responsive timing devices are also known which operate in response to the vibration of such vehicles and which so measure and indicate the running time thereof. However, travel recorders of this type cannot be used in working-machines, as they are subjected to too great mechanical stress in these machines to remain intact. Such devices have been used to a certain extent in mine locomotives, but they have not worked satisfactorily as they are too fragile, and moreover their initial cost is very high.

My invention provides a very simple, cheap and reliable apparatus for recording the effective operating time of working-machines, comprising an electrical timing circuit, a time instrument inserted into said circuit and adapted to be advanced stepwise by means of clock-pulses when said timing circuit is closed and a switching device responsive to vibrations of said working-machines adapted to close said timing circuit when exposed to such vibrations. In accordance with a further feature of the invention the sensitivity of the switching device responsive to vibrations is adjustable so as to be responsive to a predetermined minimum amplitude of the vibrations of said working-machine or to a predetermined range of frequencies of vibration.

Additional features and aspects of the invention will appear from the detailed description of the invention given below with reference to the accompanying drawings, in which FIGURE 1 shows a vibration-responsive device in the form of an electrical spring contact adapted to oscillate in a vertical plane, FIGURE 2 shows an enlarged portion of the device of FIGURE 1, and FIGURE 3 shows the device of FIGURE 1 connected in an electric circuit to be described below.

In the electrical spring contact shown in FIGURE 1 a substantially horizontal spring 1 is at one end fixed in a bracket 2 of insulating material, for instance pressboard, and is provided at its other end with a contact 3 and a weight 4. A tensioning lug 5 which can be locked by means of a screw 20 and a nut 21 is displaceable along a slit 6 in a base plate 7 provided with a counter-contact 8 opposing contact 3. By locking said tensioning lug in different positions (see FIGURE 2) the stroke of the spring designated 1 can be adjusted, with the end positions of said tensioning lug corresponding to the largest and smallest amplitudes of the spring corresponding to the lowest and highest frequencies, respectively, of the vibrations of the working-machines. Contact 3 is connected over spring 1 to a conductor 9 to an external circuit, and contact 8 is directly connected to a conductor 10 to an external circuit.

The solid lines of FIGURE 3 show the device of FIGURE 1 connected in a circuit in a working-machine. The spring designated 1 can be positioned substantially horizontally, such as is shown in FIGURE 3, with the resilient member upside down in FIGURE 3 as compared to FIGURE 1, but the position of the spring is altogether arbitrary. In certain cases it may be advantageous to position the spring in a vertical plane or in some other plane. The electrical circuit of the working-machine has three purposes. As soon as the motor of the working-machine is started its generator 12 runs and the relay 13 is thus energized connecting the electric circuit to the battery 11. The electric circuit shown in FIGURE 3 comprises three instruments 14, 15 and 17 connected in parallel between the positive pole of the battery and ground.

The instrument 14 is a time instrument i.e. an electric clock running as soon as the relay 13 is energized upon starting of the motor of the working-machine and thus indicates the running time of the motor of the working-machine. Such time instruments are known in the art and are not the subject of the present invention.

The second purpose of the electric circuit of the working-machine, for instance a dumptruck, is now to be pointed out in connection with the dashed portion of FIGURE 3 in which the instrument 17 is a counting instrument, while 18 is a hydraulic motor contact which is actuated in tipping off the load on the condition that the tipping body has been loaded a least to a certain limit and a mechanical contact 19 is operated each time the tipping device is used so that a record is made on the counting instrument 17, which thus will tell the number of times a load of the proper size has been tipped off, it thereby being possible to calculate for instance the volume of the mass tipped off. Such counting instruments are also known in the art and are also not the object of the present invention.

The invention is now to be described in connection with the third purpose of the electric circuit shown in FIGURE 3, which purpose is to indicate and measure the time during which the working-machine has been at work.

For this purpose a time instrument 15 is inserted into the electric timing circuit. Said time instrument 15 is adapted to be advanced stepwise by means of clock pulses produced for instance by a clock-controlled interrupter in the time instrument as soon as said timing circuit is closed. In order to close said timing circuit there is arranged the above-described switching device 16 which is responsive to vibrations of the working-machine. The closing of the time indicating or measuring circuit is thus prepared by the clock-controlled interrupter in the time instrument 15 and completed by the switching device 16 when exerted or excited to vibrations of predetermined amplitude from the working-machine. It is obvious that as soon as the working-machine is loaded the vibrations will be heavier and thus of greater amplitude.

The swinging amplitude of the resilient member 1 of the switching device 16 on the other hand is adjusted so as to be energized by vibrations of an amplitude corresponding to the amplitude of the vibrations of the working-machine when loaded.

In this way the electrical spring contact 3 will close the counter-contact 8 intermittently during the running of the motor of the working-machine. The time instrument 15 will accordingly be advanced stepwise by the clock-controlled interrupter if only the switching device 16 closes its contacts at least once for each unit of time.

The device operates in the following manner. The spring 1 positioned in a protective cover is placed in an appropriate spot in the working-machine, for instance in the driver's cab, and the instruments designated 14 and 15 are placed in some suitable place in the machine from a reading point of view. When the machine's motor is started the generator 12 will deliver a current in the usual manner, thus operating relay 13. This will close a circuit to the instrument designated 14, which thus records the total running time of the motor. A voltage is supplied to spring 1 over instrument 15, said spring being manually calibrated by means of the tensioning lug 5 in such a manner that it will not vibrate when the motor is idling or so that its vibrations are so small that contacts 3 and 8 do not close then. However, when the machine is brought to work spring 1 begins to vibrate vigorously so that contact 3 repeatedly strikes contact 8, a pulse being transmitted to instrument 15 each time said contacts touch each other and the first pulse moving the indicating member of said time instrument forward by one step, i.e. a distance corresponding to one time unit of work. If the machine is still at work at the end of this time unit a new pulse will be supplied to instrument 15 thereby moving the indicator needle forward another step etc. When the machine has been in operation continuously for one hour the digit means in time instrument 15 is advanced by one unit. Instruments 14 and 15 thus give information of how long the motor of the working-machine has been running and thereby of how long the machine operator has been in his place and also of how much of this time the machine has been in productive work. If desired the instruments 14 and 17 may be replaced by time instruments similar to the instrument 15 and also provided with vibration responsive switches 16. The springs calibrated for three stages, viz. (1) for idling, i.e. for the case that the machine is not at work but the motor is running, it then being possible to index the pendulum or spring for various motor revolutions, (2) for floating condition, i.e. a condition corresponding to moving, for instance moving the machine from one place of work to another, and (3) for the case that the machine actually is at work, for instance in excavating or the like, a record of the behaviour of the machine during these three different conditions of work then being obtained. When a calibration of this type has been completed the cover is put on and sealed. If desired the cover can be provided with feet which may contain vibration-absorbing rubber pads for limiting very vigorous vibrations.

The device according to the invention can be used in a great number of applications. One appropriate application would be in mines having a large centralized compressor station with the compressor dimensioned for maximum output. In order to find for how long time full capacity has been utilized it is possible to make use of a device in accordance with the invention. Another example would be in granulating machines in which it is desired to establish the effective granulating time in order to determine when the granulating machine is to be greased. In many cases bearings have been destroyed in granulators which have been well utilized, but this could have been avoided if some indication had been given of how long time the granulator actually had been at work. In granulators of this type one single instrument will be enough, viz. an instrument corrresponding to the instrument designated 15 above, as the granulator normally runs all day long, although it idles for part of this time.

The apparatus of the invention can be used to advantage not only in working-machines, another use of great importance being in mechanical and other industries. Thus it may be utilized for instance in punch presses and boring machines.

A great number of modifications and circuits can be established within the scope of my invention, and said invention is thus not restricted to the embodiments described above and illustrated in the drawings.

What I claim is:

1. In a time measuring and indicating apparatus for controlling the effective operating time of a working-machine in combination, an electrical timing circuit, a time instrument inserted into said circuit and adapted to be advanced stepwise when said timing circuit is closed, and a switching device responsive to vibrations of said working-machine, the switching device comprising a spring being at one end fixed to a bracket of insulating material and being also provided with a weight and having further contact operating means adapted to close said timing circuit when the switching device is exerted to such vibrations, said switching device being also provided with adjusting means for adjusting its sensitivity so as to be responsive to the vibrations of the working-machine above a predetermined minimum amplitude of said vibrations.

2. Apparatus as defined in claim 1, said adjusting means comprising a tensioning lug displaceable along a slit in a base plate, to which said bracket is fastened, so as to adjust the free length of said spring and thereby its frequency of vibration, said contact operating means comprising a contact element on the free end of the spring and a countercontact position on said base plate opposing said contact element.

References Cited by the Examiner
UNITED STATES PATENTS

| | | | |
|---|---|---|---|
| 1,414,910 | 5/22 | Watson | 58—143 |
| 1,750,078 | 3/30 | Willheim | 58—145 |

LEYLAND M. MARTIN, *Primary Examiner.*